US006659425B2

(12) United States Patent
Smith, III

(10) Patent No.: US 6,659,425 B2
(45) Date of Patent: Dec. 9, 2003

(54) MALE COUPLING MEMBER WITH IMPROVED FLOW PORTS

(75) Inventor: Robert E. Smith, III, Missouri City, TX (US)

(73) Assignee: National Coupling Company, Stafford, TX (US)

( * ) Notice: Subject to any disclaimer, the term of this patent is extended or adjusted under 35 U.S.C. 154(b) by 225 days.

(21) Appl. No.: 09/934,974

(22) Filed: Aug. 22, 2001

(65) Prior Publication Data
US 2003/0038264 A1 Feb. 27, 2003

(51) Int. Cl.[7] .............................................. F16K 17/00
(52) U.S. Cl. ..................................... 251/149.6; 251/339
(58) Field of Search .......................... 251/149.6, 339; 137/614–614.06

(56) References Cited

U.S. PATENT DOCUMENTS

| | | | |
|---|---|---|---|
| 2,320,339 A | | 6/1943 | Buttner |
| 2,471,237 A | | 5/1949 | Pasturczak |
| 2,599,935 A | | 6/1952 | Pasker |
| 2,645,450 A | | 7/1953 | Chessman |
| 2,727,759 A | | 12/1955 | Elliott |
| 2,727,761 A | | 12/1955 | Elliott et al. |
| 2,753,195 A | * | 7/1956 | Palmer ................. 137/614.03 |
| 2,772,898 A | | 12/1956 | Seeler |
| 3,291,152 A | | 12/1966 | Comer |
| 3,551,005 A | | 12/1970 | Brun |
| 4,150,691 A | * | 4/1979 | Maldavs ............... 137/614.03 |
| 4,214,607 A | | 7/1980 | Bouteille |
| 4,249,572 A | * | 2/1981 | Shindelar et al. ..... 251/149.6 X |
| 4,453,566 A | | 6/1984 | Henderson, Jr. et al. |
| 4,506,863 A | | 3/1985 | Quin et al. |
| 4,543,995 A | * | 10/1985 | Weh et al. ............. 137/614.06 |
| 4,597,413 A | | 7/1986 | Buseth |
| 4,637,470 A | | 1/1987 | Weathers et al. |
| 4,694,859 A | | 9/1987 | Smith, III |
| 4,703,774 A | | 11/1987 | Seehausen |
| 4,709,726 A | | 12/1987 | Fitzgibbons |
| 4,754,780 A | | 7/1988 | Smith, III |
| 4,768,538 A | | 9/1988 | Mintz et al. |
| 4,813,454 A | | 3/1989 | Smith, III |
| 4,832,080 A | | 5/1989 | Smith, III |
| 4,834,139 A | | 5/1989 | Fitzgibbons |
| 4,852,611 A | * | 8/1989 | Knerr et al. ........ 137/614.04 X |
| 4,924,902 A | | 5/1990 | Lewis et al. |
| 4,924,909 A | | 5/1990 | Wilcox |
| 5,063,965 A | | 11/1991 | Wilcox |
| 5,099,882 A | | 3/1992 | Smith, III |
| 5,203,374 A | | 4/1993 | Smith, III |
| 5,232,021 A | | 8/1993 | Smith |
| 5,343,891 A | | 9/1994 | Bosley |
| 5,360,035 A | | 11/1994 | Smith |
| 5,368,070 A | | 11/1994 | Bosley |
| 5,390,702 A | | 2/1995 | Smith, III |
| 5,406,980 A | | 4/1995 | Allread et al. |
| 5,692,538 A | | 12/1997 | Smith, III |
| 5,762,106 A | | 6/1998 | Smith, III |
| 5,947,142 A | * | 9/1999 | Nimberger et al. ..... 137/614 X |
| 6,085,785 A | | 7/2000 | Smith, III |

(List continued on next page.)

FOREIGN PATENT DOCUMENTS

FR 0180503 A1 * 10/1985 ............ F16L/37/28
FR 2 571 817 4/1986

*Primary Examiner*—Gene Mancene
*Assistant Examiner*—Eric Keasel
(74) *Attorney, Agent, or Firm*—Wong, Cabello, Lutsch, Rutherford & Brucculeri, L.L.P.

(57) ABSTRACT

An undersea hydraulic coupling member is disclosed having flow ports with concave surface at the outwardly facing ends thereof. The concave surfaces briefly and temporarily disengage the radial seals during engagement or disengagement of the male and female coupling members, thereby reducing wear and damage to radial seals between the coupling members, and allowing trapped seawater to exit or enter the receiving chamber.

5 Claims, 2 Drawing Sheets

U.S. PATENT DOCUMENTS 6,123,103 A    9/2000  Smith, III
6,202,690 B1   3/2001  Smith, III
6,206,040 B1   3/2001  Smith, III
6,227,245 B1   5/2001  Smith, III
6,283,444 B1   9/2001  Smith, III

* cited by examiner

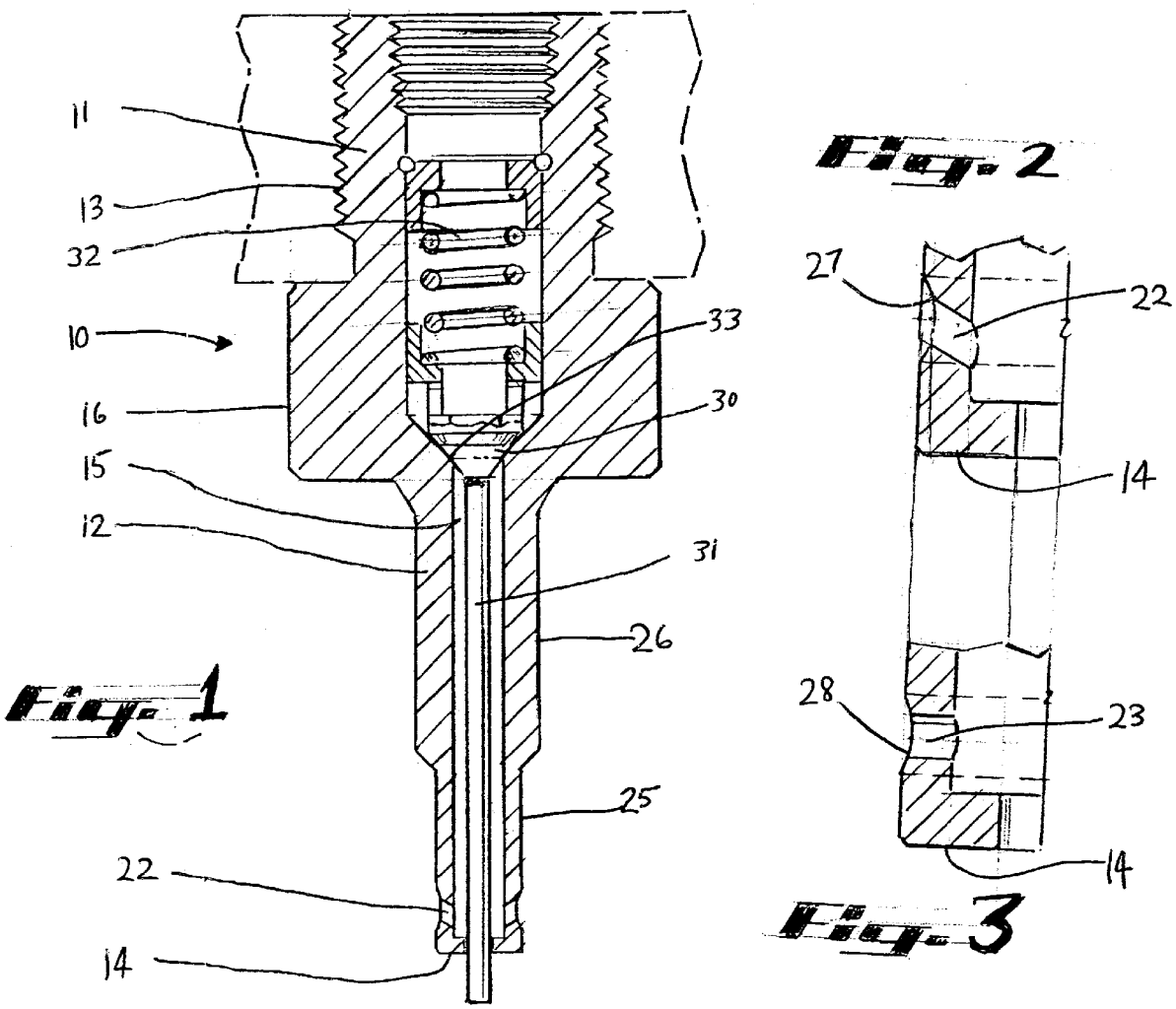

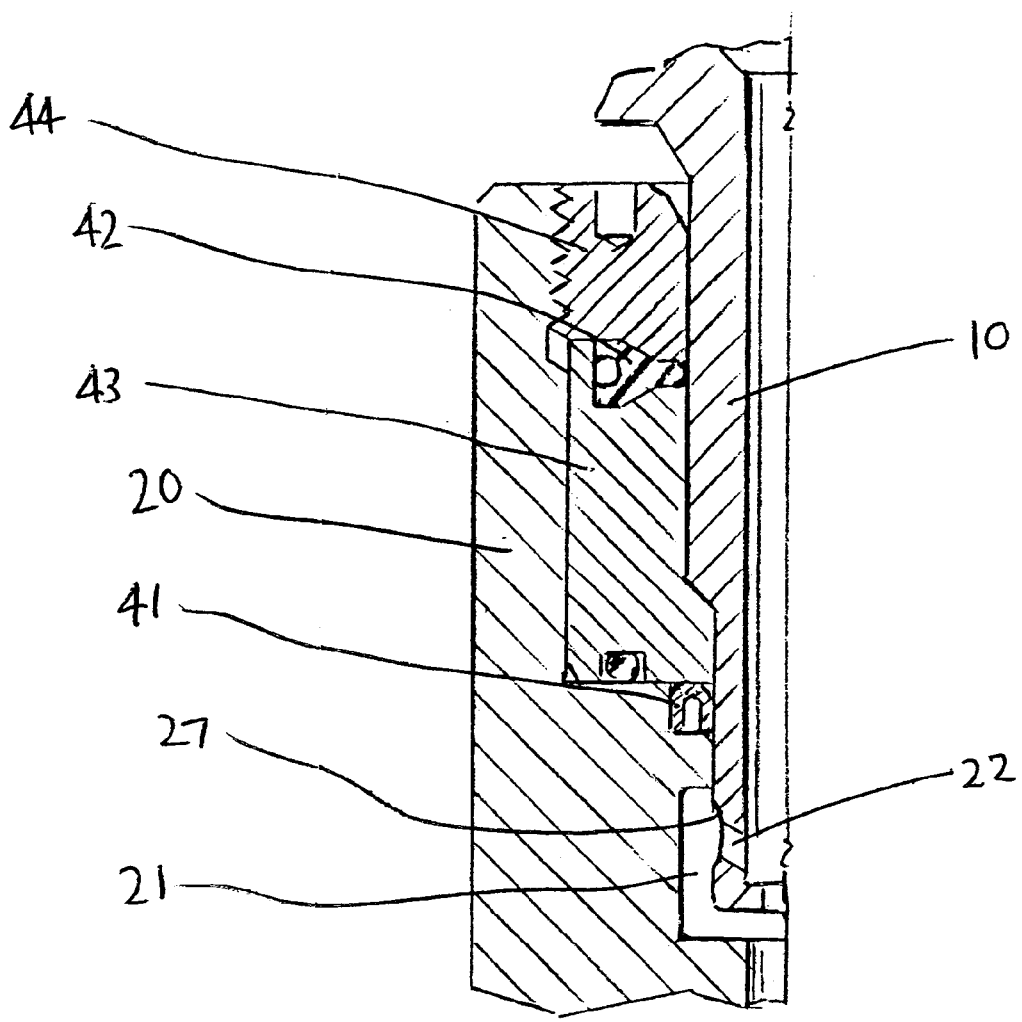

MALE COUPLING MEMBER WITH IMPROVED FLOW PORTS

BACKGROUND OF THE INVENTION

1. Field of the Invention

This invention relates in general to hydraulic couplings, and specifically to hydraulic couplings used in undersea drilling and production applications. More particularly, this invention involves a male hydraulic coupling member having an improved flow port.

2. Description of Related Art

Subsea hydraulic couplings are old in the art. The couplings generally consist of a male member and a female member with sealed fluid passageways connecting therebetween. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling. The male member includes a cylindrical portion at one end having an outer diameter approximately equal to the diameter of the large bore of the female member of the coupling. The male member also includes a connection at its other end to facilitate connection to hydraulic lines. When the cylindrical portion of the male member is inserted into the large bore of the female member, according to various embodiments of the device, fluid flow is established between the male and female members. Couplings of this type are shown in U.S. Pat. No. 4,694,859 to Robert E. Smith, III and other patents owned by National Coupling Company, Inc. of Stafford, Tex.

In undersea drilling and production applications, the male member of the coupling may be connected to a manifold plate or other securement at a subsea location at the inside or outside of a well bore. The female members, which also may be secured to a manifold plate, are moved into position over the male members and then lowered onto the male members by a diver or subsea vehicle. When the female members are positioned on the male members, hydraulic fluid flow typically is from the female member to the male member of each coupling. In some cases, only the female member of the coupling has a poppet valve.

The poppet valve typically includes a conical valve face which seats, in the closed position, against a valve seat in the coupling member. The poppet valve opens to allow fluid flow, and closes against the valve seat within the bore to arrest the flow. Generally, the poppet valve is spring-biased to the closed position. The valve may include a valve actuator which may be a nose or stem extending from the apex of the valve face along the longitudinal axis of the poppet valve.

In the couplings of U.S. Pat. No. 4,694,859, for example, hydraulic fluid flows longitudinally between the male and female coupling members. A number of different improvements and variations have been introduced in the configuration of flow ports and flow passages in couplings used for undersea applications. Some undersea hydraulic couplings are pressure balanced, for example, which may be achieved by hydraulic flow through aligned radial flow passages in the coupling members. The radial flow passages are generally perpendicular to the longitudinal axis of the coupling, so hydraulic pressure tending to separate the coupling members is significantly reduced. In the male coupling members, radial passages typically extend from the central bore outward to the cylindrical outer surface of the probe. Examples of pressure balanced couplings are shown in U.S. Pat. Nos. 4,754,780, 5,099,882, and 4,832,080 to Robert E. Smith III, assigned to National Coupling Company, Inc.

Male undersea hydraulic coupling members also may include flow ports that are angled to prevent ingress of debris when the coupling members are disconnected. Frequently, well bores in which the couplings are positioned are full of debris. The male member, which remains subsea when the coupling is disconnected, is subject to debris accumulating in flow passages. The debris may contaminate the hydraulic fluid or cause wear to the seals and sealing surfaces in hydraulic couplings and hydraulic systems. To reduce or eliminate this problem, couplings such as those of U.S. Pat. No. 5,692,538 to Robert E. Smith, III have utilized angled flow ports that prevent ingress of debris into the hydraulic lines.

In the past, radial or angled flow passages in male undersea hydraulic coupling members had a tendency to scrape or rub the metal and/or elastomeric seals in the female coupling members when the male members were engaged to or disengaged from the female coupling members. This could damage the sealing surfaces of metal and/or elastomeric seals, especially for couplings that are repeatedly connected and disconnected. Damage to the sealing surfaces between the male and female coupling members, as a result of repeated engagement and disengagement of the coupling members, could then result in the risk of leakage or loss of hydraulic fluid in the subsea environment.

There also is a need for undersea hydraulic couplings that allows seawater to bleed from or into the receiving chamber of the female member during coupling and/or uncoupling. When the male member is engaged to the female member, trapped seawater in the receiving chamber tends to block or resist full and complete engagement of the male member therein. When the male member is disengaged, this can result in a vacuum, increasing the separation force necessary to apply thereto.

SUMMARY OF THE INVENTION

The present invention resides in a male undersea hydraulic coupling member having improved flow ports to prevent or reduce damage to radial seals in the female coupling member. At the outwardly facing end of each flow port, a concave surface is provided that temporarily disengages all or a portion of the radial metal seal(s) in the female coupling member. The concave surface may comprise a plurality of dish-shaped surfaces, with each dish-shaped surface adjacent the outwardly facing end of a flow port. Or, the concave surface may comprise a channel encircling the probe section adjacent the outwardly facing ends of the flow ports. When a radial seal is briefly disengaged, the concave surface allows seawater to bleed from or into the receiving chamber during connection or disconnection of the male and female coupling members.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 1 is a section view of a male member of a coupling according to a first preferred embodiment of the present invention.

FIG. 2 is an expanded section view of the improved flow port according to the first preferred embodiment.

FIG. 3 is an expanded section view of the improved flow port according to a second preferred embodiment.

FIG. 4 is a partial section view of the male member of the first preferred embodiment inserted into a female a coupling member.

DETAILED DESCRIPTION OF THE PREFERRED EMBODIMENTS

As shown in FIG. 1, male coupling member 10 includes body section 11, probe section 12, and flange 16 therebetween. The male member includes handle 13 that is threaded or otherwise attached to a manifold plate. The male member includes first end or leading face 14. Internal bore 15 extends through the body and probe sections of the male member to facilitate the flow of hydraulic fluid therethrough. To control the flow of hydraulic fluid, the male member also includes a normally closed poppet valve 30 in the internal bore with actuator 31 extending therefrom. Valve spring 32 urges the poppet valve into the closed position against valve seat 33.

When the coupling is connected, the probe section of the male member enters the receiving chamber in the female member of the coupling. The actuator urges the poppet valve open, and hydraulic fluid enters through angled flow ports 22 extending between the male member's internal bore 15 and the outer circumference of the probe section. In the first preferred embodiment, the flow ports in the male coupling member are angled to prevent ingress of debris when the female member is disconnected and the male member remains subsea. In the second embodiment, as shown in FIG. 3, the male coupling member has radial flow ports 23. Preferably, each male member has two or four flow ports, but any number of flow ports may be provided. Leading face 14 of the male member is closed, although actuator extends therethrough. The probe section may have a uniform outer diameter or a stepped outer diameter as shown in FIG. 1, showing first diameter 25 and second diameter 26 which is larger than the first diameter.

Now referring to FIG. 2, concave surface 27 is adjacent the outerwardly facing end of each angled flow port 22. The concave surface may be a dish-shaped recess immediately surrounding the outwardly facing end of each flow port. Alternatively, the concave surface may form a channel encircling the probe section at the outwardly facing end of each flow port. FIG. 3 shows the concave surface 28 adjacent the outwardly facing end of radial flow port 23.

During engagement or disengagement of the coupling members, the concave surface briefly and temporarily disengages all or part of the radial seal in the female member. Now referring to FIG. 4, when the male member is filly inserted into female member 20, hydraulic fluid may flow through the internal bore of the male member and the flow ports between the internal bore and the outer circumference. When the concave surface disengages the seals temporarily during coupling and uncoupling, the concave surface at the outwardly facing end of each flow port reduces or eliminates scraping, rubbing, or other damage to seals 41 and 42 in the female member. The present invention helps improve the life, effectiveness and leak resistance of couplings having radial metal or radial elastomeric seals. In FIG. 4, seal 41 is a radial metal seal and seal 42 is a radial elastomeric seal with a dovetail interfit between the retainer sleeve 43 and retainer locking member 44.

The present invention allows trapped seawater to exit from receiving chamber 21 of the female member during insertion of the male member. During insertion of the male member into the receiving chamber, as the concave surface on the probe circumference passes each seal and disengages all or part of the seal briefly, seawater may flow from the receiving chamber, through the gap between the concave surface and the seal, and through the unsealed intersection between the male and female members. Thus, the concave surface at the outwardly facing end of each flow port is dimensioned such that the radial seal becomes disengaged briefly from the concave surface.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. An undersea hydraulic coupling comprising:

(a) a male member with a body section having a first outer diameter, a probe section having a second outer diameter smaller than the first outer diameter, a leading face, an internal bore extending through the body section and probe section and terminating at the leading face, and a valve in the body section for controlling hydraulic fluid flow through the internal bore;

(b) at least one flow port extending at an angle from the internal bore outwardly through the second outer diameter probe section, and a concave surface at the outwardly facing end of the at least one flow port; and (c) a female member having a receiving chamber dimensioned to sealingly engage only the probe section of the male member.

2. The undersea hydraulic coupling of claim 1 wherein the concave surface is a channel encircling the probe section at the outwardly facing end of the at least one flow port.

3. An undersea hydraulic coupling comprising:

(a) a male member having a body section with a first cylindrical outer surface, a probe section having a second cylindrical outer surface smaller in diameter than the first cylindrical outer surface, an internal bore, a poppet valve with an actuator extending therefrom, a leading face through which the actuator extends, and a plurality of flow ports extending at an angle from the internal bore through the cylindrical outer surface;

(b) a concave surface in the second cylindrical outer surface of the probe section, the concave surface positioned adjacent each angled flow port; and (c) a female coupling member dimensioned for insertion of the probe section and having a plurality of radial seals dimensioned to sealingly engage the probe section.

4. The undersea hydraulic coupling of claim 3 wherein the concave surface comprises a channel encircling the cylindrical outer surface of the probe section.

5. The undersea hydraulic coupling of claim 3 wherein the concave surface is dimensioned to disengage temporarily the plurality of radial seals.

* * * * *